(12) United States Patent
Willey et al.

(10) Patent No.: US 9,102,454 B2
(45) Date of Patent: Aug. 11, 2015

(54) PACKAGING

(75) Inventors: Jason Denis Willey, Barry (GB); Parbinder Cheema, Bournville (GB)

(73) Assignee: Cadbury UK Limited, Bournville (GB)

( * ) Notice: Subject to any disclaimer, the term of this patent is extended or adjusted under 35 U.S.C. 154(b) by 504 days.

(21) Appl. No.: 13/381,486

(22) PCT Filed: Jul. 8, 2010

(86) PCT No.: PCT/GB2010/001306
§ 371 (c)(1),
(2), (4) Date: Mar. 8, 2012

(87) PCT Pub. No.: WO2011/004156
PCT Pub. Date: Jan. 13, 2011

(65) Prior Publication Data
US 2012/0156415 A1    Jun. 21, 2012

(30) Foreign Application Priority Data

Jul. 8, 2009   (GB) .................................. 0911823.3

(51) Int. Cl.
| B32B 38/00 | (2006.01) |
| B65D 75/58 | (2006.01) |
| B26F 1/22 | (2006.01) |

(Continued)

(52) U.S. Cl.
CPC .............. B65D 75/5833 (2013.01); B26F 1/22 (2013.01); B32B 37/12 (2013.01); B65D 75/5855 (2013.01); B26D 3/085 (2013.01); B26F 1/384 (2013.01); B32B 37/0053 (2013.01); B32B 37/10 (2013.01); B32B 37/1292 (2013.01); B32B 2038/045 (2013.01); B32B 2553/00 (2013.01);
(Continued)

(58) Field of Classification Search
CPC ...................... B65D 75/5833; Y10T 156/1052; B32B 2038/45; B32B 2553/00

USPC ......... 156/250, 251, 253, 256, 257, 268, 290; 428/43; 493/227, 228
See application file for complete search history.

(56) References Cited

U.S. PATENT DOCUMENTS 1,802,879 A * 4/1931 Cumfer ......................... 156/207
5,233,813 A * 8/1993 Kenney et al. .................. 53/450
(Continued)

FOREIGN PATENT DOCUMENTS

| GB | 900083 | 7/1962 |
| WO | 2008029332 A2 | 3/2008 |
| WO | 2008/115693 A1 | 9/2008 |
| WO | 2009111153 A1 | 9/2009 |

*Primary Examiner* — Mark A Osele
*Assistant Examiner* — Christopher C Caillouet
(74) *Attorney, Agent, or Firm* — Hoffmann & Baron, LLP

(57) ABSTRACT

A packaging wrapper (14) is made of material (48) having inner (50) and outer (52) laminate structures bonded together. A peelable flap (24) is defined in the wrapper by means of offset score lines (54, 56) in the laminate structures, the structures being bonded together in a marginal region between the score lines by means of a peelable adhesive (60). In one aspect of the invention, the score lines (54, 56) are formed using a pair of contra-rotating die cylinders (80, 82, FIG. 8) positioned on opposite sides of the laminated film Each cylinder contacts a respective laminate structure and has a blade (86, 88) for forming a score line in that structure. In another aspect, the laminate structures (50, 52) are bonded together using a single peelable adhesive (60) both within and outside of the marginal region. In a further aspect, the structures (50, 52) are not bonded together in at least part of the marginal region to provide a lifting tab (46) for the flap.

10 Claims, 8 Drawing Sheets

(51) Int. Cl.
*B32B 37/12* (2006.01)
*B26D 3/08* (2006.01)
*B26F 1/38* (2006.01)
*B32B 38/04* (2006.01)
*B32B 37/10* (2006.01)
*B32B 37/00* (2006.01)

(52) U.S. Cl.
CPC .......... *Y10T 156/10* (2015.01); *Y10T 156/1052* (2015.01); *Y10T 428/15* (2015.01)

(56) References Cited

U.S. PATENT DOCUMENTS

| | | |
|---|---|---|
| 6,177,163 B1 * | 1/2001 | Blok et al. .................. 428/40.1 |
| 2003/0091771 A1 * | 5/2003 | Weder .......................... 428/35.7 |
| 2004/0007319 A1 * | 1/2004 | Squier et al. .................. 156/277 |
| 2005/0276525 A1 | 12/2005 | Hebert et al. |
| 2006/0010742 A1 | 1/2006 | Steininger |
| 2008/0156861 A1 * | 7/2008 | Sierra-Gomez et al. ...... 229/214 |

* cited by examiner

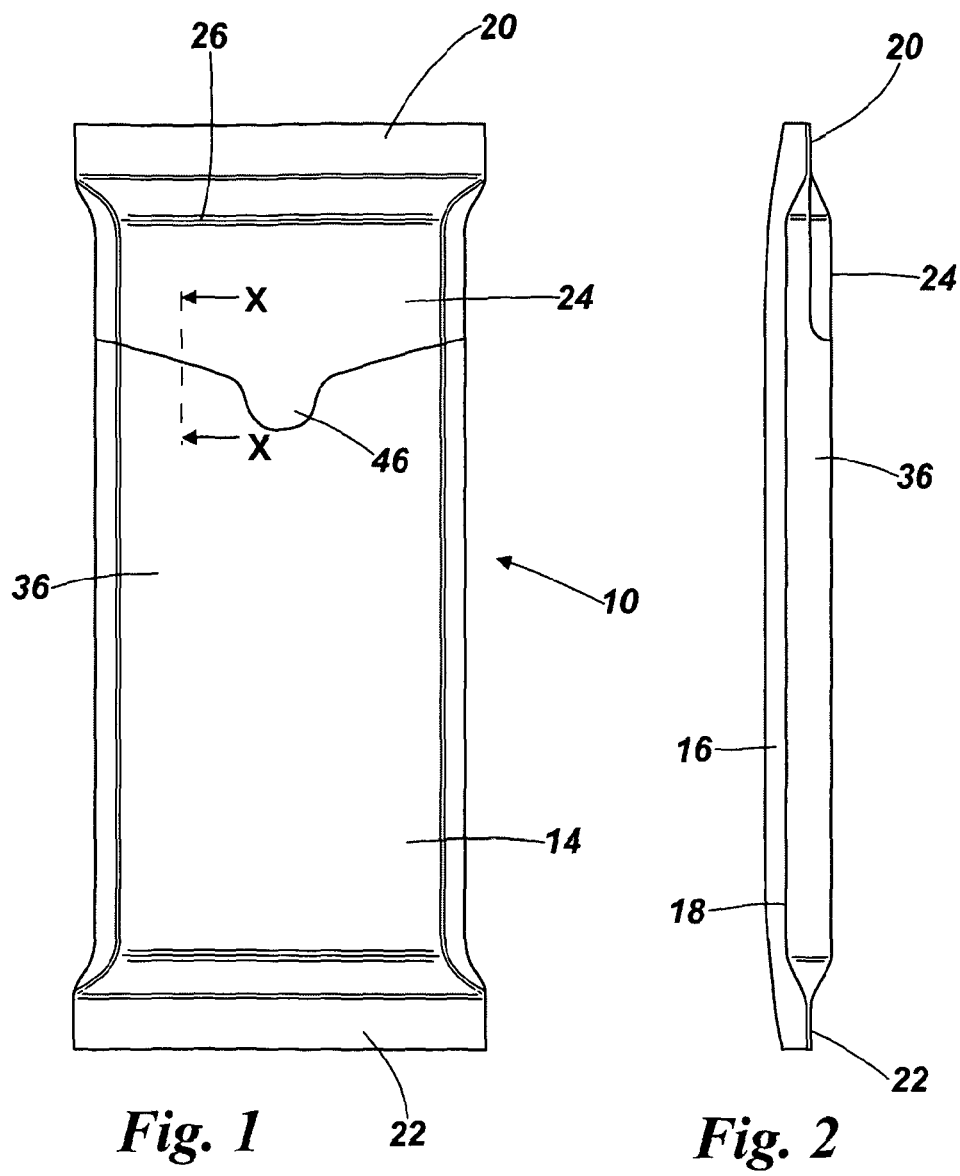
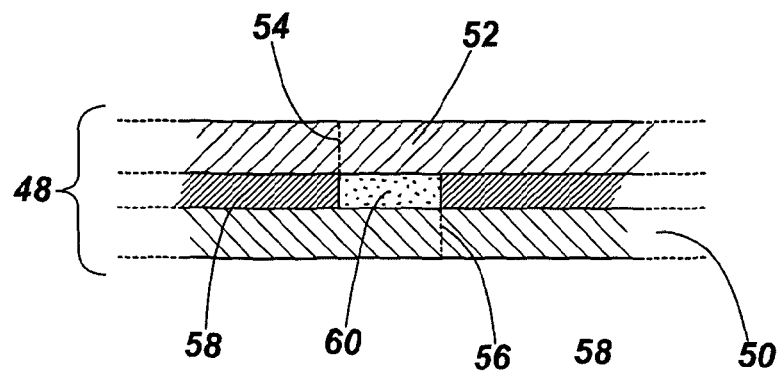

PACKAGING

CROSS-REFERENCE TO RELATED APPLICATIONS

This application is the National Stage of International Application No. PCT/GB2010/001306, which designates the U.S., filed Jul. 8, 2010, which claims the benefit of Great Britain Application No. GB 0911823.3 filed Jul. 8, 2009, the contents of which are incorporated by reference herein.

TECHNICAL FIELD OF THE INVENTION

The present invention relates to methods of manufacturing a laminated film for re-closable packaging and to a packaging having a re-closable opening feature.

BACKGROUND TO THE INVENTION

It is known to package a variety of products, including food products such as chocolate bars and other snack type confectionery products, in a wrapper that is fabricated from laminated film and which has a re-closable opening feature such as a flap or the like. US 2005/0276525 describes a package of this type, which will be referred to herein after as "packaging of the type defined", and a method of manufacturing the package.

The present application is directed to improved methods of manufacturing a laminated film having a re-closable opening feature for use in producing packaging of the type described.

The present application is also directed to an improved packaging of the type described.

SUMMARY OF THE INVENTION

In accordance with a first embodiment of the invention, there is provided a method of manufacturing a laminated packaging film having a re-closable opening feature, the method comprising:

a. adhesively bonding an outer laminate structure to an inner laminate structure to form a laminated film, each of the outer and inner laminate structures comprising at least one layer of flexible material;

b. forming an outer score line through the thickness of the outer laminate structure and an inner score line through the thickness of the inner laminate structure, the outer score line delineating an outer opening portion of the outer structure that is separable from the remainder of the outer structure along the outer score line, the inner score line delineating an inner opening portion of the inner structure that is affixed to the outer opening portion by the adhesive and is separable from remainder of the inner structure along the inner score line, wherein at least part of a marginal region of the outer structure between the outer and inner score lines is attached to an underlying surface of the inner structure by the adhesive, the marginal region of the outer opening portion being peelable from the underlying surface of the inner structure so as to cause the inner opening portion to also be peeled back to create an opening in the laminated film, the marginal region of the outer structure being re-attachable to the underlying surface of the inner structure for re-closing the opening;

in which the step of forming the outer and inner score lines is carried out using a pair of contra-rotating die cylinders, one of the die cylinders being positioned for contact with the outer laminate structure and having a blade for forming the outer score line, the other die cylinder being arranged for contact with the inner laminate structure and having a blade for forming the inner score line.

The contra rotating dies may be configured so as to press the outer and inner laminate structures together as part of the step of adhesively bonding the structures before the blades contact the outer and inner structures respectively to form the outer and inner score lines.

The step of adhesively bonding the outer and inner laminate structures may comprise:

a. applying a permanent laminating adhesive to one surface of at least one of the structures except for a marginal region of the surface which is to lie between the outer and inner score lines;

b. applying a peelable adhesive to at least part the marginal region of said one surface of said at least one of the structures; and c. bringing said one surface into contact with an opposing surface of the other of the structures to form a bond.

In an alternative arrangement, the step of adhesively bonding the outer and inner laminate structures comprises:

a. applying a peelable adhesive to at least part of a marginal region of one surface of at least one of the structures, which marginal region is to lie between the outer and inner score lines, and to the remainder of said surface outside the marginal region; and b. bringing said one surface into contact with an opposing surface of the other of the structures to form a bond.

In the alternative arrangement, no adhesive may be applied to at least part of the marginal region of said one surface.

In the alternative arrangement, the step of adhesively bonding the structures may comprise passing the structures between a pair of rollers to press the structures together, the rollers being configured such that a lower pressure is applied to the structures in the marginal region which is to lie between the outer and inner score lines than to the rest of structures.

The peelable adhesive may be a cold seal adhesive or a pressure sensitive adhesive.

In accordance with a second embodiment of the invention, there is provided a method of manufacturing a laminated packaging film having a re-closable opening feature, the method comprising:

a. adhesively bonding an outer laminate structure to an inner laminate structure to form a laminated film, each of the outer and inner laminate structures comprising at least one layer of flexible material;

b. forming an outer score line through the thickness of the outer laminate structure and an inner score line through the thickness of the inner laminate structure, the outer score line delineating an outer opening portion of the outer structure that is separable from the remainder of the outer structure along the outer score line, the inner score line delineating an inner opening portion of the inner structure that is affixed to the outer opening portion by the adhesive and is separable from remainder of the inner structure along the inner score line, wherein at least part of a marginal region of the outer structure between the outer and inner score lines is attached to an underlying surface of the inner structure by the adhesive, the marginal region of the outer opening portion being peelable from the underlying surface of the inner structure so as to cause the inner opening portion to also be peeled back to create an opening in the laminated film, the marginal region of the outer structure being re-attachable to the underlying surface of the inner structure for re-closing the opening;

in which the step of adhesively bonding the outer and inner laminate structures comprises applying a peelable adhesive to at least part a marginal region of one surface of at least one of the structures, which marginal region is to lie between the outer and inner score lines, and to the remainder of said surface outside the marginal region and bringing said one surface into contact with an opposing surface of the other of the structures to form a bond.

No adhesive may be applied to at least part of the marginal region of said one surface.

The step of adhesively bonding the structures may comprise passing the structures between a pair of rollers to press the structures together, the rollers being configured such that a lower pressure is applied to the structures in the marginal region which is to lie between the outer and inner score lines than to the rest of structures.

The peelable adhesive may be a cold seal adhesive or a pressure sensitive adhesive.

In the methods according to either of the first or second embodiments of the invention, the method may comprise printing on an innermost surface of the outer laminate structure.

In the methods according to either of the first or second embodiments of the invention, no adhesive may be applied in part of a marginal region between the inner and outer score lines so that part of the marginal region of the outer structure is not bonded to the underlying inner structure to form a tab for the opening feature. A coating or surface treatment may be applied to the outer surface of the tab to increase its co-efficient of friction. Alternatively, or in addition, a coating or surface treatment could be applied to the outer surface of the tab to cause the tab to curl or lift away from the inner structure. Alternatively, or in addition, the method may comprise introducing or producing a feature between the tab and the inner structure which causes the tab to lift away from the inner structure.

In accordance with a third embodiment of the invention, there is provided a packaging comprising a wrapper of flexible laminated material having a re-closable opening feature, the wrapper comprising:
  a. an outer laminate structure bonded by means of an adhesive to an inner laminate structure, each of the outer and inner laminate structures comprising at least one layer of flexible material;
  b. an outer score line through the thickness of the outer laminate structure and an inner score line through the thickness of the inner laminate structure, the outer score line delineating an outer opening portion of the outer structure that is separable from the remainder of the outer structure along the outer score line, the inner score line delineating an inner opening portion of the inner structure that is affixed to the outer opening portion by the adhesive and is separable from remainder of the inner structure along the inner score line, wherein at least part of a marginal region of the outer structure between the outer and inner score lines is attached to an underlying surface of the inner structure by the adhesive, the marginal region of the outer opening portion being peelable from the underlying surface of the inner structure so as to cause the inner opening portion to also be peeled back to create an opening in the laminated film, the marginal region of the outer structure being re-attachable to the underlying surface of the inner structure for re-closing the opening;
in which the inner and outer laminate structures are bonded together using a single peelable adhesive.

The peelable adhesive may be a cold seal adhesive or a pressure sensitive adhesive.

In accordance with a fourth embodiment of the invention, there is provided packaging comprising a wrapper of flexible laminated material having a re-closable opening feature, the wrapper comprising:
  a. an outer laminate structure bonded by means of an adhesive to an inner laminate structure, each of the outer and inner laminate structures comprising at least one layer of flexible material;
  b. an outer score line through the thickness of the outer laminate structure and an inner score line through the thickness of the inner laminate structure, the outer score line delineating an outer opening portion of the outer structure that is separable from the remainder of the outer structure along the outer score line, the inner score line delineating an inner opening portion of the inner structure that is affixed to the outer opening portion by the adhesive and is separable from remainder of the inner structure along the inner score line, wherein at least part of a marginal region of the outer structure between the outer and inner score lines is attached to an underlying surface of the inner structure by the adhesive, the marginal region of the outer opening portion being peelable from the underlying surface of the inner structure so as to cause the inner opening portion to also be peeled back to create an opening in the laminated film, the marginal region of the outer structure being re-attachable to the underlying surface of the inner structure for re-closing the opening;
  in which a part of the marginal region of the outer structure is not bonded to the underlying inner structure to form a tab for the opening feature.

A coating or surface treatment may be applied to the outer surface of the tab to increase its co-efficient of friction. Alternatively, or in addition, a coating or surface treatment may be applied to the outer surface of the tab to cause the tab to curl or lift away from the inner structure. Alternatively, or in addition, a feature may be provided between the tab and the inner structure which causes the tab to lift away from the inner structure.

DETAILED DESCRIPTION OF THE INVENTION

Several embodiments of the invention will now be described, by way of example only, with reference to the accompanying drawings, in which:

FIG. 1 is a plan view of a first embodiment of a packaging of the type defined, showing the packaging in a closed condition;

FIG. 2 is a side view of the packaging of FIG. 1;

FIG. 5 is a cross sectional view in an enlarged scale through part of the packaging of FIG. 1 taken on line X-X;

Figure 3:
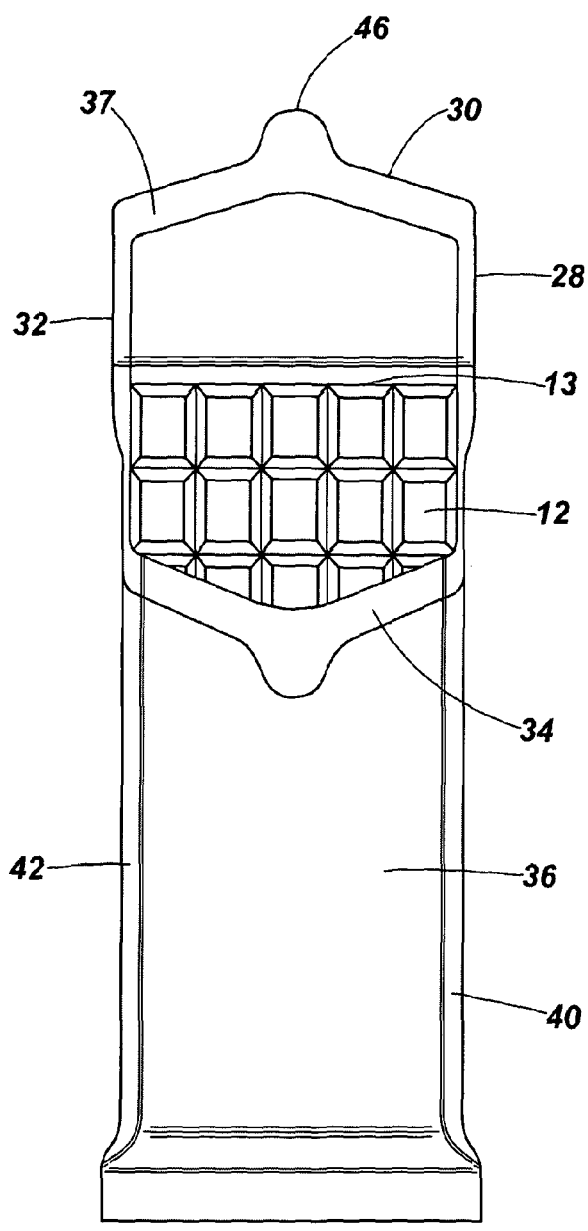
FIG. 3 is a view similar to that of FIG. 1 but showing the packaging in an open condition.
Figure 4:
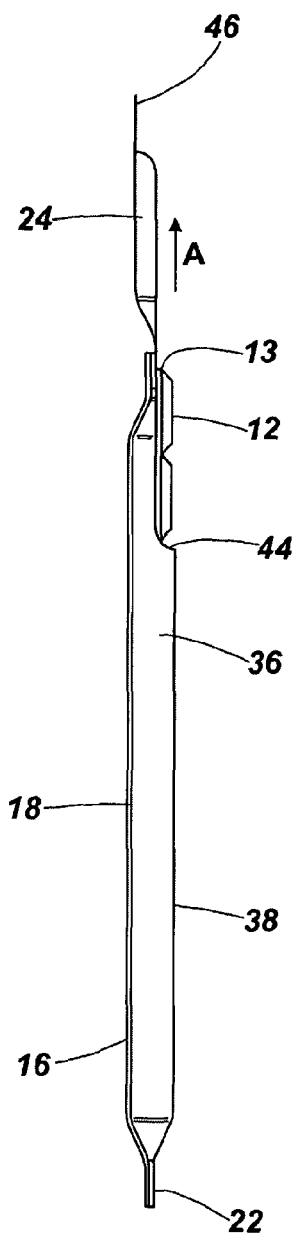
FIG. 4 is a side view of the packaging of FIG. 3.

FIGS. 1 to 5 illustrate an embodiment of a packaging 10 in accordance with an embodiment of the present invention. The packaging 10 is particularly suited for packaging generally block shaped food products such as chocolate bars 12 or other similar confectionery products but can be adapted for packaging other generally block shaped products. The packaging 10 can also be used to package products provided in two or more generally block shaped portions. For example, the packaging 10 could be used to package multiple chocolate or other confectionery bars arranged in-line. It should be noted, however, that the various embodiments of the invention that are the subject of the present application are not limited to application in respect of packaging for generally block shaped products but can be applied more generally to packaging of the type defined regardless of the shape or nature of the product to be packaged.

The packaging 10 comprises a wrapper 14 of flexible material which is folded around the product and sealed to fully enclose the product. Overlapping longitudinal edge regions of the wrapper 14 are bonded together to form a longitudinal fin seam 16 which extends along a rear face 18 of the packaging. Opposing end edge regions of the material are bonded together to form transverse sealed seams 20, 22 at either end of the product.

The wrapper 14 has a flap portion 24 near to one end which forms a sealed and re-closable opening feature for the packaging. The flap 24 is foldably connected with the remainder of the wrapper 14 along one edge 26 adjacent to the transverse seam 20 at one end of the package. The flap has three free edges 28, 30 32, which overlap a marginal region 34 of a main body portion 36 of the wrapper. The free edges 28, 30, 32 of the flap are bonded to the overlapping marginal region 34 of the main body portion 36 by means of a peelable and re-closable adhesive. The flap extends fully across the front face 38 of the package and at least partially down opposing sides 40, 42 so that when it is peeled back, it reveals an opening or aperture 44 at the end of the package through which the product 12 can be removed in a longitudinal direction, as indicated by arrow A in FIG. 4. A tab 46 is provided on the free end 30 of the flap which can be grasped by a consumer to peel the flap 24 open.

The packaged product is supplied with the flap 24 in a closed and sealed condition. A consumer opens the package 10 by grasping the tab 46 and peeling the flap 24 away from the main body portion 36 to reveal an opening or aperture 44 through which the rigid bar 12 can be slid out of the main body portion 36 of the package in a longitudinal direction. Where the bar 12 is a portioned bar, it need be slid out only far enough to enable the consumer to break off one or more portions as required. The remaining bar 12 can then be slid back into the package and the flap 24 re-sealed to keep it secure.

The peelable seal between the flap 24 and the marginal region 34 may be fully re-sealable but in practice it will not usually be expected to form a hermetic seal when the flap is re-closed. In most applications it will be sufficient if the strength of the bond formed when the flap is re-closed is sufficient that the flap is able to hold the remaining contents securely in the package and to provide some protection for the product from the environment. In the case where the packaging is used to package a food product, such as a chocolate bar, it is expected that the flap 24 will be fully sealed when the package is formed prior to the first opening. In some cases, the packaging will initially form a hermetically sealed package, though for some foodstuffs a hermetically sealed package is not desirable.

The packaging 10 can be produced using a flow-wrap method in which a film 48 of material having a number appropriately positioned flap portions 24 disposed along its length is supplied in a roll to package products 12 in a substantially continuous process. The material is fed through a machine which folds it about each product in turn so that opposing longitudinal edge regions are brought into contact and bonded together to form the longitudinal seam 16. The material is crimped at either end of the product to form the transverse end seams 20, 22 and the material is cut to separate each package from the remainder of the film.

The film 48 is a laminate having an inner structure 50 and an outer structure 52. In the present embodiment, the inner structure 50 is a metallic foil or another metalised material and the outer structure 52 is a plastics material. However, the inner and outer structures 50, 52 can be made from any flexible materials suitable for packaging the product concerned. Examples of typical materials include: paper based materials, one or more polymeric materials, and metallic foils. Each of the inner and outer structures 50, 52 could itself be a lamination of two or more layers of materials. Where the product is a food product, the laminated material 48 may be substantially moisture and gas impervious so that when the wrapper 14 is fully sealed, the packaging 10 provides a hermetically sealed container for the product. However, this is not essential.

The flap portions 24 are formed as an integral part of the film 48 by producing offset score lines, which may be through cuts or lines of weakness, in the inner and outer structures of the laminated material as illustrated in FIG. 5. A first or outer score line 54 is formed though the outer structure 52 and delineates an outer edge of an outer opening portion in the outer structure which is separable from the remainder of the outer structure 52 along the outer score line. A second or inner score line 56, spaced inwardly from the first, is formed through the inner structure 50 and delineates an inner opening portion in the inner structure which is affixed to the outer structure 52 and is separable from the remainder of the inner structure 50 along the inner score line. The distance between the first and second score lines 54, 56 defines the marginal region 34 where the edges outer opening portion of the outer structure 52 overlie the remainder of inner structure 50.

In the present embodiment, the inner and outer structures 50, 52 are bonded together by a permanent adhesive 58 over the majority of their areas. However, in at least part of the marginal region 34 between the inner and outer score lines, the structures 50, 52 are bonded together by means of a peelable and re-sealable adhesive 60. The peelable and re-sealable adhesive 60 may be a cold seal or pressure sensitive adhesive. In an alternative embodiment to be described below, the inner and outer structures 50, 52 are bonded together using only a single peelable adhesive both in the marginal region 34 and in the remaining lamination area of the structures.

Figure 7:
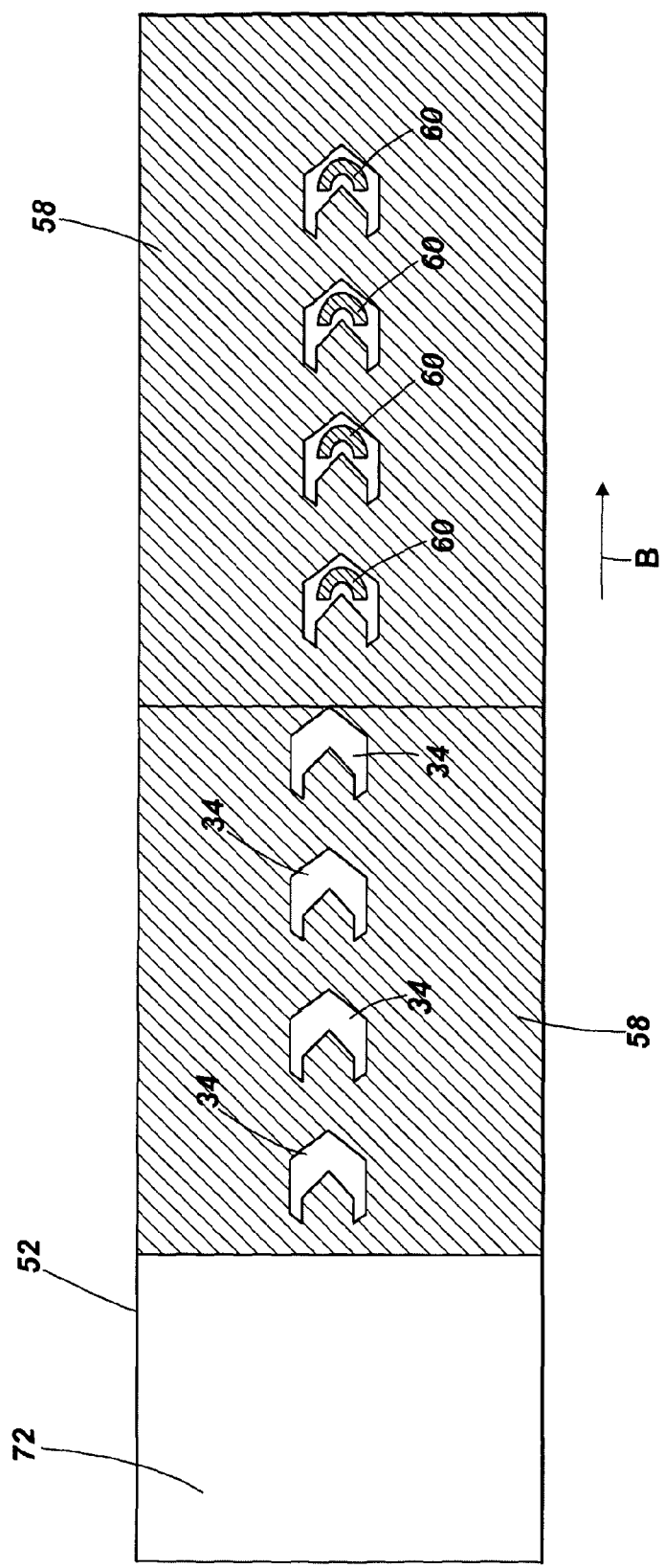
FIG. 7 is a schematic plan view of part one structure used to form a laminated film illustrating how adhesives are applied to the structure as part of the manufacturing process carried out using the manufacturing process line of FIG. 6.
Figure 8:
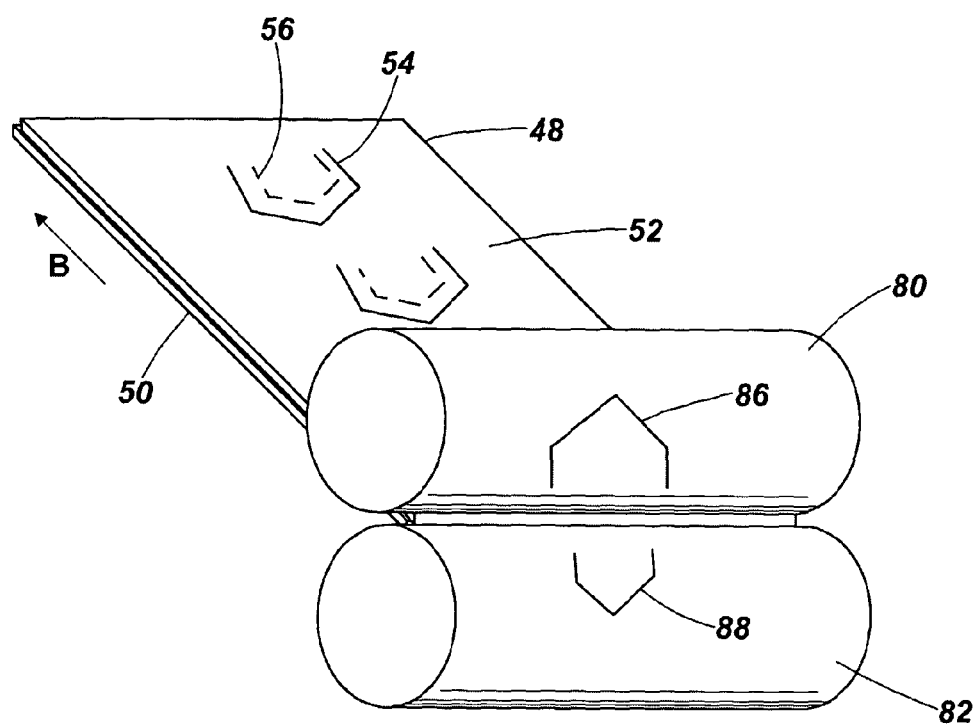
FIG. 8 is a schematic perspective view of a pair of die-cylinders forming part of the manufacturing process line of FIG. 6.

A method of manufacturing a laminated packaging film 48 having a re-closable opening feature in accordance with the present invention will now be described with reference initially to FIGS. 6 to 8. The method can be used to produce a packaging film suitable for producing packaging of the type defined including, but not limited to, the packaging 10 described above.

Figure 6:
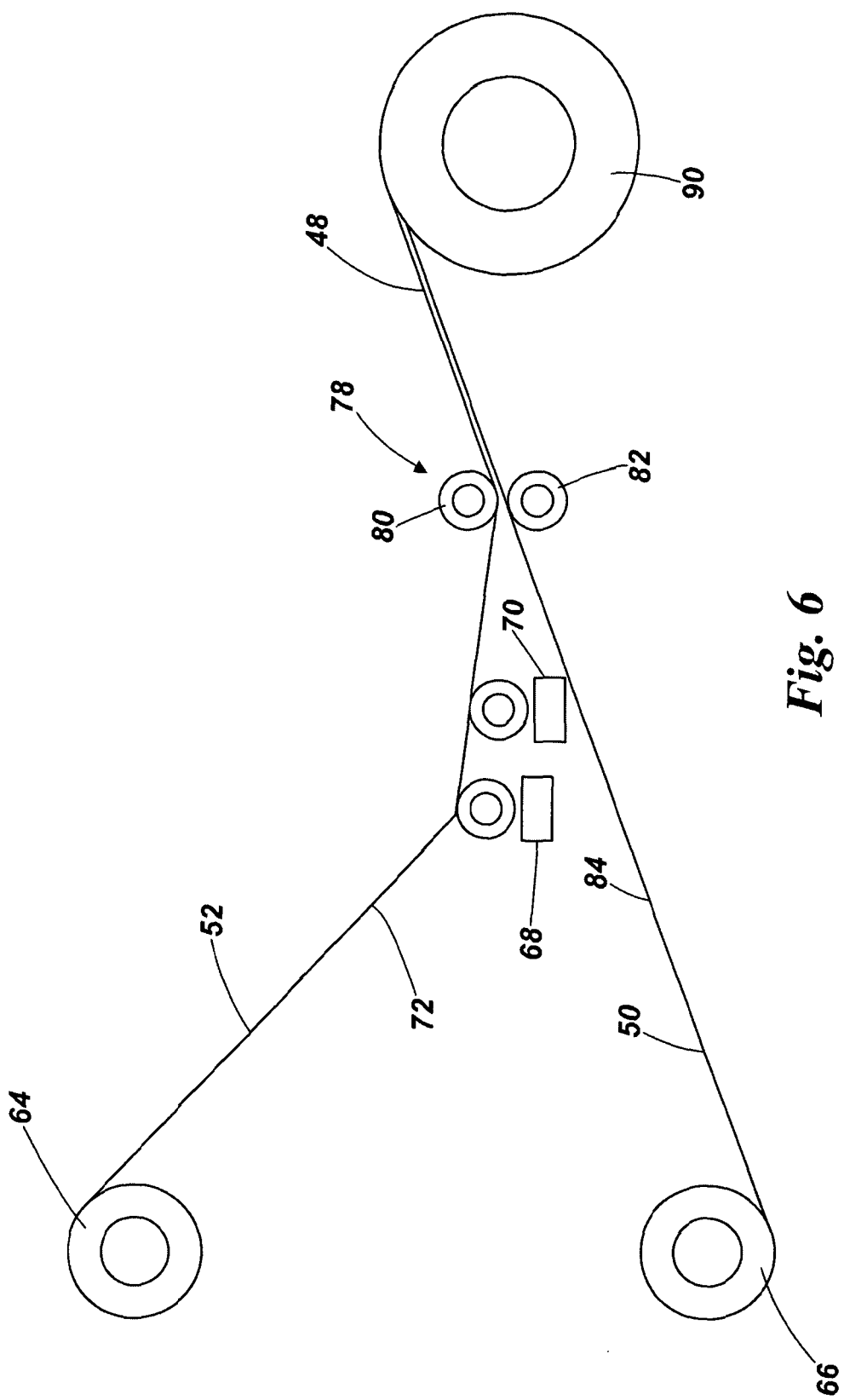
FIG. 6 is a drawing illustrating schematically a manufacturing process line for manufacturing a laminated film in accordance with the invention.

FIG. 6 illustrates schematically part of a manufacturing process line for producing a laminated film 48 for producing packaging of the type defined.

An outer laminate structure 52 is fed from a first roll 64 whilst an inner laminate structure 50 is fed from a second roll 66. The outer laminate structure 52 is passed through two adhesive stations 68, 70. A first adhesive station 68 applies a permanent laminating adhesive 58 to an inner face 72 of the outer structure 52. As illustrated in FIG. 7, the permanent adhesive 58 is applied to substantially the whole of the surface area of the inner face 72 except for the marginal region 34 which is to lie between the outer and inner score lines 54, 56. Arrow B in FIGS. 7 and 8 indicates the direction of feed.

At the second adhesive station 70 a peelable adhesive 60, which may be a pressure sensitive adhesive or a cold seal, is applied to the inner face 72 of the outer structure 52 within the marginal region 34. The peelable adhesive 60 may be applied to the whole of the marginal region 34 or, as illustrated, to only part of the marginal region. For use in packaging food products and the like, the peelable adhesive 60 may be applied in the marginal region so that a hermetic seal is formed between the inner and outer structures, at least until the wrapper is first opened.

Where a tab 46 is to be formed to assist a user in opening the package, part of the outer structure 52 in the marginal region 34 which is to form the tab is not bonded to the inner structure 50. Accordingly, no adhesive is applied in the marginal region 34 in the region where the tab is to be produced. Typically this will be adjacent an outer edge of the marginal region 34.

The inner and outer structures 50, 52 are brought together at a combined laminating/scoring station 78 where they pass between a pair of contra-rotating cylinders 80, 82. The cylinders 80, 82 act as rollers to press the inner and outer structures 50, 52 together so that the adhesive on the inner surface 72 of the outer structure 52 bonds to the inwardly facing surface 84 inner structure 50 to form a lamination.

In the present embodiment, the cylinders 80, 82 are die cylinders which carry blades 86, 88 to form the outer and inner score lines 54, 56 respectively. Thus the outer cylinder 80 carries a first blade 86 which contacts the outer structure 50 to form the outer score line 54 and the inner cylinder 82 carries a second blade 88 for contact with the inner structure 52 to form the inner score line 5 6, as illustrated in FIG. 8. The blades 86, 88 are arranged on the cylinders 80, 82 so that they contact the structures 50, 52 after the structures have been laminated together. The blades 86, 88 may have a depth in the region of 35 to 45 microns depending on the respective thicknesses of the inner and outer structures 50, 52.

After passing through the laminating/scoring station 78, the laminated film 48 with the die cut flaps 24 is wound in to a roll 90. The laminated film may be cured either before or after being wound.

The permanent laminating adhesive 58 and/or the peelable adhesive 60 may be applied to their respective areas of the inner surface 72 in a pattern rather than coating the whole of the surface within these areas. It will also be appreciated that the order in which the adhesives are applied could be reversed so that peelable adhesive 58 is applied at the first adhesive station 68 and the permanent adhesive 58 applied at the second adhesive station 70. Furthermore, it will be appreciated that the adhesives could be applied to the inner surface 84 of the inner structure 50 and that one or both of the adhesives may be applied to both the inner and outer laminate structures 50, 52.

Whilst it can be advantageous to use a single pair of cylinders 80, 82 to laminate the structures 50, 52 and to form the inner and outer score lines 54, 56, in alternative arrangements these processes can be carried out at separate stations. Thus the inner and outer structures 50, 52 can be brought together at a lamination station where they pass between a first pair of cylinders or rollers which press the structures together. The laminated film 48 is then advanced to a scoring station comprising a pair of contra-rotating die cylinders 80, 82 having blades 86, 88 which produce the outer and inner score lines.

Figure 9:
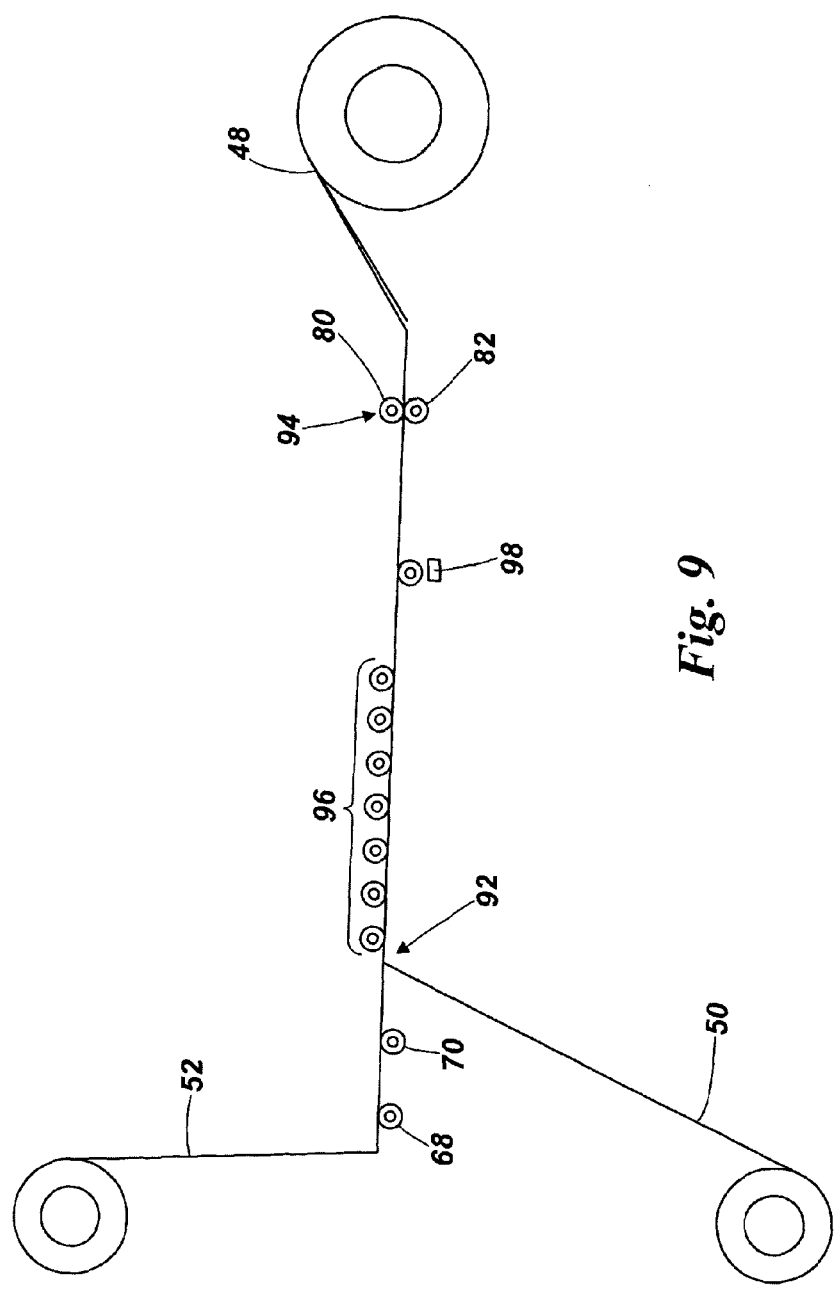
FIG. 9 is a drawing similar to that of FIG. 6 but illustrating a first alternative embodiment of a manufacturing process line for manufacturing a laminated film in accordance with the invention.

FIG. 9 illustrates schematically an example of an alternative embodiment of a manufacturing process line for manufacturing a laminated film 48 for use in producing packaging of the type defined in which the lamination and scoring process are separated. Thus the inner and outer structures 50, 52 are brought together at a laminating station 92 and the die-cylinders 80, 82 are located at a separate scoring station 94 down stream of the lamination station for producing the score lines. Although not shown in FIG. 9, the laminating station 92 will typically comprise a pair of rollers which press the inner and outer structures 50, 52 together.

Between the lamination station 92 and the scoring station 94 are a printing station 96 and a third adhesive station 98. At the printing station 96, printing is applied to the outer surface of the outer structure 52. At the third adhesive station 98, a cold seal or other adhesive is pre-applied to the exposed surface of the inner structure 50 for use when the film 48 is formed into individual wrappers 14 surrounding a product.

Where the outer structure 52 is transparent, printing could be applied to the outer surface of the inner structure 50 or, as illustrated in the following embodiment, on the inner surface of the outer structure 52.

Figure 10:
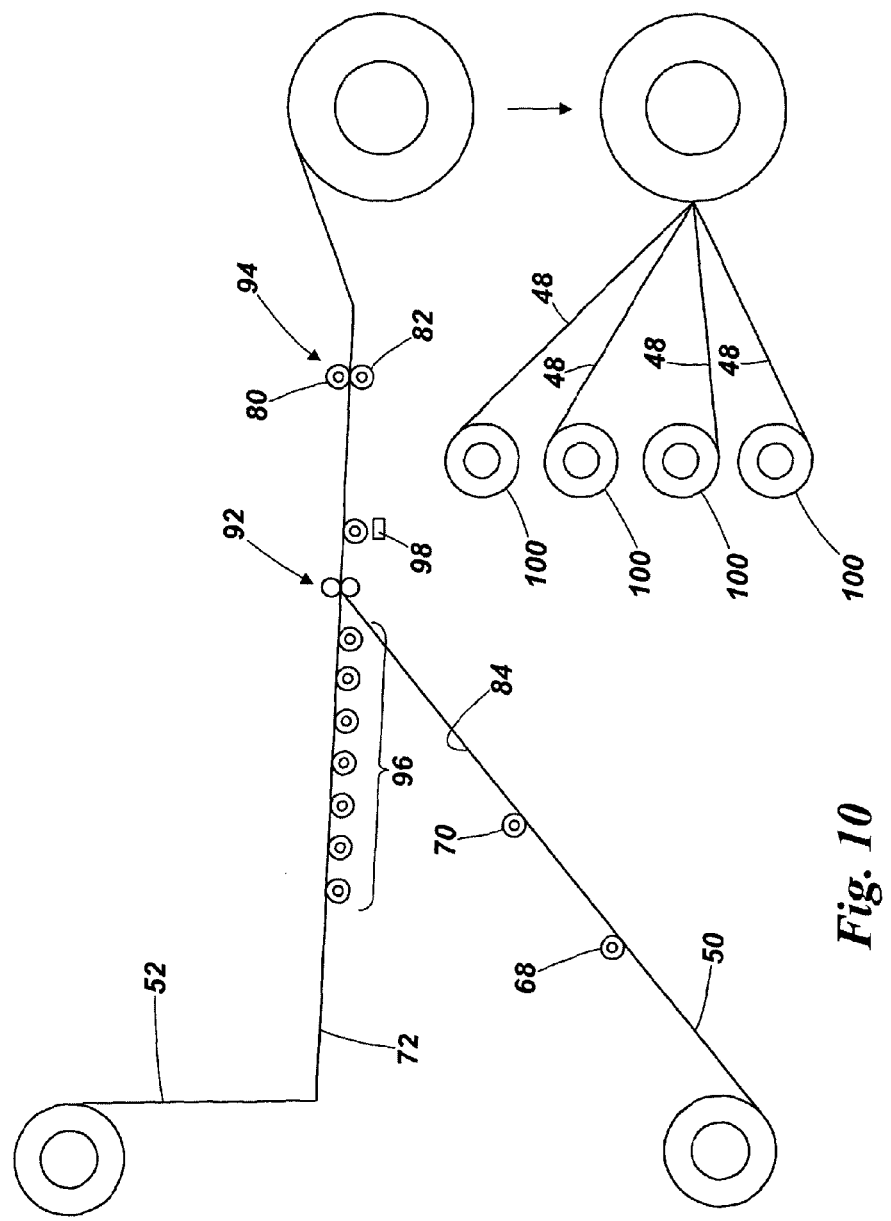
FIG. 10 is a drawing similar to that of FIG. 6 but illustrating a second alternative embodiment of a manufacturing process line for manufacturing a laminated film in accordance with the invention.

FIG. 10 illustrates schematically a further embodiment of a manufacturing process line for manufacturing a laminated film 48 for use in producing packaging of the type defined. The manufacturing process line in this embodiment is adapted to enable printing on the inner surface 72 of the outer laminate structure 52. This is possible where the outer structure 52 comprises a transparent plastics material for example. Accordingly, the first and second adhesive stations 68, 70 are arranged to apply the permanent and peelable adhesives to the inwardly facing surface 84 of the inner structure 50 and the printing station 96 is located upstream of the lamination station 92. As with the previous embodiment, the scoring station 94 is separate from and located downstream of the laminating station 92 and comprises die-cylinders 80, 82 for producing the outer and inner score lines 54, 56. A third adhesive station 98 is located between the laminating station 92 and the scoring station 94 at which a cold seal or other adhesive is pre-applied to the exposed surface of the inner structure 50 for use when the film 48 is formed into individual wrappers 14 surrounding a product.

As is common practice in the art, the film 48 can be initially produced in a width that is equivalent to the width required to wrap several products and split lengthways into multiple rolls as indicated at 100 in FIG. 10 after the film has been cured. In this case, the die-cylinders 80, 82 will have an appropriate number of blades positioned along their length.

Additional process steps may be included in any of the manufacturing process lines described above as required. This may included drying or curing steps, for example. It should also be noted that a combined laminating/scoring station 78 could be adopted in the manufacturing process lines exemplified in FIGS. 9 and 10 and that printing and cold seal application stations 96, 98 can be incorporated into the manufacturing process line illustrated in FIG. 6. Furthermore, whilst the die-cylinders 80, 82 in the present embodiments are adapted to produce through cuts 54, 56 in the inner and outer structures, where appropriate, they could be modified to produce a line of weakness such as a line of perforations.

In the manufacturing process lines described above it is necessary to ensure proper registration of the inner and outer structures 50, 52 and the laminated film 48 as they/it pass through the various processing stations so that the permanent and peelable adhesives 58, 60 are applied in the correct positions relative to each other and to the outer and inner score lines 54, 56 and that they are all in registration with the printing applied to the film. This can be achieved using known methods of sensing in the art.

Rather than using adhesive 58 to permanently bond the inner and outer structures 50, 52 together outside of the marginal region 34, the structures may be fused together by means of heat or electromagnetic treatment where they are made of suitable materials. This would eliminate the need to apply two different types of adhesive. In one embodiment, the die-cylinders 80, 82 could be modified to carry out the heat or electromagnetic treatment to fuse the structures together and to produce the inner and outer score lines 54, 56 in a single process station. The manufacturing process lines described above can be modified accordingly.

In a further modified method of manufacturing the film 48, rather than using two different types of adhesive to laminate the inner and outer structures 50, 52, a single peelable adhesive can be used to bond inner and outer structures 50, 52 together both in the marginal region and the remainder of the lamination area. The advantage of using a single type of adhesive is that it can be applied at a single adhesive station prior to lamination of the structures. This eliminates the need to effect registration between two adhesive stations at which different adhesives are applied as in the previously described embodiments and so simplifies the manufacturing process and can lead to a reduction in waste.

The peelable adhesive will typically be a cold seal adhesive and will be applied over the entire surface area of the inner surface of one or both of the inner and outer structures 50, 52, except for any parts of the marginal region that are to remain un-bonded, such as the opening tab 46. The peelable adhesive may be applied in a pattern. The bond formed by the adhesive should be sufficient to prevent unwanted de-lamination of the inner and outer structures whilst enabling the marginal region of the outer structure 52 to be pealed away from the marginal region of the inner structure. The arrangement may be such that a smaller binding force holding the inner and outer structures 50, 52 together is produced within all or part of the marginal region which is to lie between the inner and outer score lines 54, 56 than in the rest of the lamination. One way of achieving this would be to modify the rollers or cylinders that press the structures 50, 52 together so as to apply a lower pressure inside all or part of the marginal region than in the remainder of the lamination. To this end, the rollers may be profiled, contoured or otherwise treated. One embodiment of this is illustrated in FIGS. 11 and 12.

Figure 11:
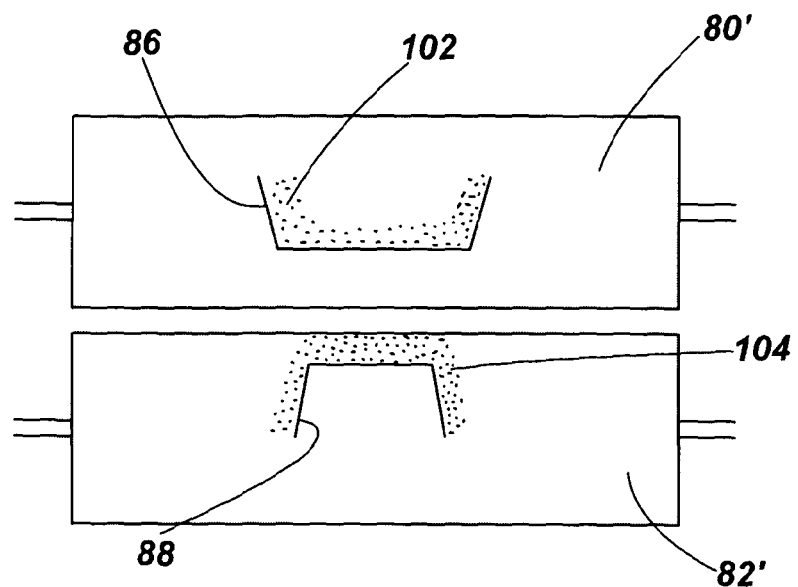
FIG. 11 is a schematic side view of a set of modified die cylinders which can be used in accordance with an embodiment of the present invention.

FIG. 11 shows schematically a modified set of die-cylinders 80', 82' similar to those described above in relation to FIGS. 6 and 8 that are adapted to press the inner and outer structures 50, 52 together as part of the lamination process and to produce the inner and outer score lines 54, 56. In this embodiment, the cylinders 80', 82' are made of steel and each has a surface region 102, 104 adjacent their respective blades 86, 88 which is pitted or otherwise treated to reduce the pressure applied to the inner and outer structures 50, 52 when they pass between the cylinders. Each region 102, 104 is positioned on the side of the blade 86, 88 which lies within the marginal region between the inner and outer score lines 54, 56.

Figure 12:
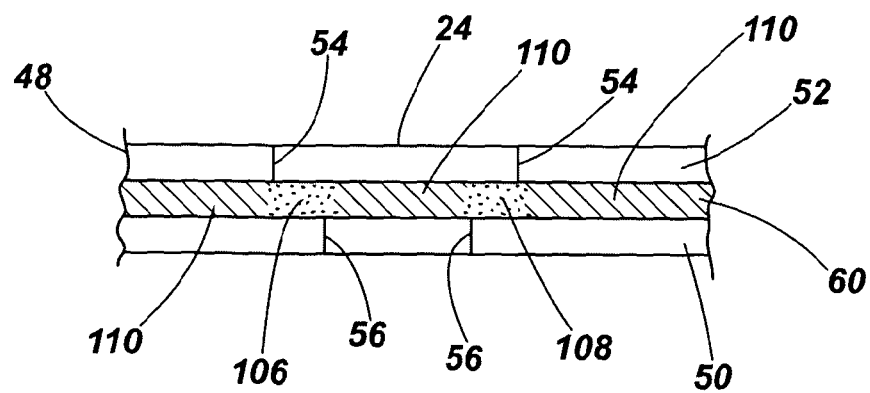
FIG. 12 is a cross-sectional view through a laminated material produced using the die cylinders as shown in FIG. 11.

FIG. 12 illustrates in cross-section a laminated film produced using the modified cylinders 80', 82. The cross section in FIG. 12 is taken in a lateral direction of the film across a flap 24 and shows two parts of the marginal region, one on either side of the flap. This is in contrast with FIG. 5 in which the cross section is taken in a longitudinal direction of the film across one part of the marginal region only.

In this drawing, the inner and outer structures 50, 52 are shown as being bonded together using a single peelable adhesive 60. In the marginal areas 106, 108 which align with the surface treated regions 102, 104 of the cylinders 80', 82', a lower binding force is produced between the adhesive and the structures and/or within the adhesive. This is indicted schematically by the use of dotted shading. In the remaining areas 110, a higher binding force is produced, which is indicated schematically by the use of crossed line shading. In the present embodiment, the treated surface regions 102, 104 cover substantially the whole of the marginal area between the inner and outer score lines 54, 56. This makes it easier to separate the outer structure 52 from the inner structure 50 in the marginal region whilst inhibiting de-lamination of the remainder of the film. However, the cylinders 80', 82' could be arranged so that only part of the marginal region is subject to a lower binding force.

It will be appreciated that other ways of modifying the cylinders 80', 82' to reduce the pressure applied to laminate the inner and outer structures 50, 52 within the marginal region. For example, the cylinders could have troughs formed in their surfaces adjacent the blades or the regions 102, 104 may be covered in a material having a higher resilience than the remainder of the cylinders.

The method of laminating the inner and outer structures 50, 52 together using a single peelable adhesive applied in both in the marginal region and in the remainder of the lamination area between the two structures can be used regardless of the method adopted for forming the inner and outer score lines 54, 56. Accordingly, this aspect of the invention is not limited to the use of die-cylinders but could be equally adopted where the score lines are formed by means or lasers or any other suitable method.

An issue with packaging of the type defined is the need to produce a tab 46 which can be easily lifted by a user to open the package. A particular problem is that the score lines 54, 56 used to define the flap are very fine which can make it difficult for a user to insert a finger nail under the flap 46 to lift it. To overcome this problem a number of approaches may be taken to make the flap 46 conducive to pressure and/or friction so as to lift when a thumb or finger is passed over it. These include:
Increasing the size of the tab;
Shaping the tab to facilitate lifting and efficiently directing forces applied to the tab to the peeling of the tab;
Applying coatings or surface finishes to the outer surface of the flap to increase its co-efficient of friction such as anti-slip varnishes, rubber finishes and textured coatings;

An alternative approach is to take steps to encourage the flap to lift so that it can be more easily grasped. This could be achieved in a number of ways, including:
Applying coatings or surface finishes to the outer surface of the flap to cause the tab to curl such as a shrink reactive varnish or using a heat treatment surface layer;
Positioning something between the inner and outer structures to push the tab up;

The above techniques may be used singly or in combination but it is preferable that they do not cause the tab to lift when the film 48 is on the reel but only once it has been formed into a wrapper about a product.

Whilst the invention has been described in relation to the packaging 10 shown in FIGS. 1 to 5 of the accompanying drawings, it should be appreciated that the various embodiments of the invention can be applied to any suitable packaging of the type defined.

The foregoing embodiments are not intended to limit the scope of protection afforded by the claims, but rather to describe examples how the invention may be put into practice.

The invention claimed is:

1. A method of manufacturing a laminated packaging film having a re-closable opening feature, the method comprising:
   a. adhesively bonding an outer laminate structure to an inner laminate structure to form a laminated film, each of the outer and inner laminate structures comprising at least one layer of flexible material;
   b. forming an outer score line through the thickness of the outer laminate structure and an inner score line through the thickness of the inner laminate structure, the outer score line delineating an outer opening portion of the outer structure that is separable from the remainder of the outer structure along the outer score line, the inner score line delineating an inner opening portion of the inner structure that is affixed to the outer opening portion by the adhesive and is separable from remainder of the inner structure along the inner score line, wherein at least part of a marginal region of the outer structure between the outer and inner score lines is attached to an underlying surface of the inner structure by the adhesive, the marginal region of the outer opening portion being peelable from the underlying surface of the inner structure so as to cause the inner opening portion to also be peeled back to create an opening in the laminated film, the marginal region of the outer structure being re-attachable to the underlying surface of the inner structure for re-closing the opening;
   in which the step of forming the outer and inner score lines is carried out using a pair of contra-rotating die cylinders positioned opposite one another at a single station on opposite sides of the laminated film, one of the die cylinders being positioned for contact with the outer laminate structure and having a blade for forming the outer score line, the other die cylinder being arranged for contact with the inner laminate structure and having a blade for forming the inner score line;
   wherein the contra rotating dies are configured so as to press the outer and inner laminate structures together as part of the step of adhesively bonding the structures before the blades contact the outer and inner structures respectively to form the outer and inner score lines.

2. A method as claimed in claim 1, in which the step of adhesively bonding the outer and inner laminate structures comprises:
   a. applying a permanent laminating adhesive to one surface of at least one of the structures except for a marginal region of the surface which is to lie between the outer and inner score lines;
   b. applying a peelable adhesive to at least part the marginal region of said one surface of said at least one of the structures; and
   c. bringing said one surface into contact with an opposing surface of the other of the structures to form a bond.

3. A method as claimed in claim 2, in which the peelable adhesive is a cold seal adhesive.

4. A method as claimed in claim 2, in which the peelable adhesive is a pressure sensitive adhesive.

5. A method as claimed in claim 1, in which the step of adhesively bonding the outer and inner laminate structures comprises:
   a. applying a peelable adhesive to at least part of a marginal region of one surface of at least one of the structures, which marginal region is to lie between the outer and inner score lines, and to the remainder of said surface outside the marginal region; and
   b. bringing said one surface into contact with an opposing surface of the other of the structures to form a bond.

6. A method as claimed in claim 5, in which no adhesive is applied to at least part of the marginal region of said one surface.

7. A method as claimed in claim 5, in which the step of adhesively bonding the structures comprises passing the structures between a pair of rollers to press the structures together, the rollers being configured such that a lower pressure is applied to the structures in the marginal region which is to lie between the outer and inner score lines than to the rest of structures.

8. A method as claimed in claim 5, in which the step of adhesively bonding the structures comprises passing the structures between a pair of rollers to press the structures together, the rollers being configured such that a lower pressure is applied to the structures in the marginal region which is to the lie between the outer and inner score lines than to the rest of structures.

9. A method of manufacturing a laminated packaging film having a re-closable opening feature, the method comprising:
   a. adhesively bonding an outer laminate structure to an inner laminate structure to form a laminated film, each of the outer and inner laminate structures comprising at least one layer of flexible material;
   b. forming an outer score line through the thickness of the outer laminate structure and an inner score line through the thickness of the inner laminate structure, the outer score line delineating an outer opening portion of the outer structure that is separable from the remainder of the outer structure along the outer score line, the inner score line delineating an inner opening portion of the inner structure that is affixed to the outer opening portion by the adhesive and is separable from remainder of the inner structure along the inner score line, wherein at least part of a marginal region of the outer structure between the outer and inner score lines is attached to an underlying surface of the inner structure by the adhesive, the marginal region of the outer opening portion being peelable from the underlying surface of the inner structure so as to cause the inner opening portion to also be peeled back to create an opening in the laminated film, the marginal region of the outer structure being re-attachable to the underlying surface of the inner structure for re-closing the opening;
   in which the step of adhesively bonding the outer and inner laminate and the step of forming the outer and inner score lines is carried out using a pair of contra-rotating die cylinders positioned on opposite sides of the laminated film, one of the die cylinders being positioned for contact with the outer laminate structure and having a blade for forming the outer score line, the other die cylinder being arranged for contact with the inner laminate structure and having a blade for forming the inner score line.

10. A method as claimed in claim 9, in which the steps of laminating the inner and outer laminate structures together and forming the inner and outer score lines are both carried out at a single station by the contra rotating dies.

* * * * *